(12) United States Patent
Weinberger et al.

(10) Patent No.: US 8,244,667 B1
(45) Date of Patent: Aug. 14, 2012

(54) QUERYING MULTIDIMENSIONAL DATA WITH INDEPENDENT FACT AND DIMENSION PIPELINES COMBINED AT QUERY TIME

(75) Inventors: Benjamin Weinberger, San Francisco, CA (US); Manoj Plakal, New York, NY (US); Will Robinson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 627 days.

(21) Appl. No.: 11/874,468

(22) Filed: Oct. 18, 2007

(51) Int. Cl.
*G06F 7/00* (2006.01)
*G06F 17/00* (2006.01)

(52) U.S. Cl. .................... 707/603; 707/737; 707/754

(58) Field of Classification Search .............. 707/2, 3, 707/4, 5, 600, 603, 737, 754
See application file for complete search history.

(56) References Cited

U.S. PATENT DOCUMENTS

| | | | | |
|---|---|---|---|---|
| 5,519,859 A * | 5/1996 | Grace | ........................ | 707/3 |
| 5,590,319 A * | 12/1996 | Cohen et al. | ........................ | 707/4 |
| 5,675,785 A * | 10/1997 | Hall et al. | ........................ | 707/600 |
| 5,848,408 A * | 12/1998 | Jakobsson et al. | ........................ | 707/3 |
| 5,960,428 A * | 9/1999 | Lindsay et al. | ........................ | 707/4 |
| 6,161,103 A * | 12/2000 | Rauer et al. | ........................ | 707/999.004 |
| 6,163,774 A * | 12/2000 | Lore et al. | ........................ | 705/36 R |
| 6,189,004 B1 * | 2/2001 | Rassen et al. | ........................ | 707/3 |
| 6,282,532 B1 * | 8/2001 | Sandell | ........................ | 707/1 |
| 6,711,563 B1 * | 3/2004 | Koskas | ........................ | 707/769 |
| 6,721,749 B1 * | 4/2004 | Najm et al. | ........................ | 707/100 |
| 6,850,952 B2 * | 2/2005 | Tse et al. | ........................ | 707/999.101 |
| 7,035,843 B1 * | 4/2006 | Bellamkonda et al. | ........................ | 707/3 |
| 7,117,193 B1 * | 10/2006 | Basko et al. | ........................ | 707/1 |
| 7,315,849 B2 * | 1/2008 | Bakalash et al. | ........................ | 707/2 |
| 7,447,681 B2 * | 11/2008 | Lightstone et al. | ........................ | 707/3 |
| 2004/0236767 A1 * | 11/2004 | Soylemez et al. | ........................ | 707/100 |
| 2008/0133568 A1 * | 6/2008 | Grosset et al. | ........................ | 707/102 |
| 2008/0270363 A1 * | 10/2008 | Hunt et al. | ........................ | 707/3 |

* cited by examiner

*Primary Examiner* — James Trujillo
*Assistant Examiner* — Pavan Mamillapalli
(74) *Attorney, Agent, or Firm* — Fish & Richardson P.C.

(57) ABSTRACT

Separate subsystems are dedicated to handle fact and dimension data storage and retrieval in an optimized manner. Each subsystem acquires, processes, and stores its data separately in a manner appropriate to the characteristics of that data. A query engine combines the data from each subsystem at query time. When a user queries the system, the query engine interacts with each of the subsystems to fetch the data needed to generate a single result set.

17 Claims, 5 Drawing Sheets

QUERYING MULTIDIMENSIONAL DATA WITH INDEPENDENT FACT AND DIMENSION PIPELINES COMBINED AT QUERY TIME

TECHNICAL FIELD

The subject matter of this application is generally related to data warehousing.

BACKGROUND

A data warehouse is a repository of an organization's information that also provides facilities to allow a data analyst to perform complex queries and analysis (e.g., data mining) on the information. Conventional data warehouses often include a single relational database management system (RDBMS), including various add-on tools and data warehouse-specific optimizations. A deficiency of such conventional technologies is that they use a single underlying system for acquisition, storage and retrieval of both fact and dimension data. The different characteristics of these data types means that a system optimized to handle one data type efficiently will generally not handle the other data type efficiently, particularly at large scale. For example, many conventional data warehouses use an ACID (atomicity, consistency, isolation, durability)-compliant transactional RDBMS for storage and data management. Such a conventional system, however, is typically unnecessary for fact data, and imposes a performance penalty as fact data streams into the system.

SUMMARY

Separate subsystems are dedicated to handle fact and dimension data storage and retrieval in an optimized manner. Each subsystem acquires, processes, and stores its data separately in a manner appropriate to the characteristics of that data. A query engine combines the data from each subsystem at query time. When a user queries the system, the query engine interacts with each of the subsystems to fetch the data needed to generate a single result set.

In some implementations, a method includes: obtaining fact data; obtaining dimension data; processing the fact data and the dimension data independently, wherein for each of the fact data and the dimension data, the processing is based on characteristics of that data; and combining results of the processing in response to a query.

In some implementations, a system includes a first subsystem operable for processing fact data. A second subsystem is operable for processing dimension data, independent of the fact data processing, wherein for each of the fact data and the dimension data, the processing is based on characteristics of that data. A query engine is operable for combining results of the processing in response to a query.

Other implementations are disclosed, including implementations directed to systems, methods, apparatuses, computer-readable mediums and user interfaces.

DETAILED DESCRIPTION

System Overview

Figure 1:
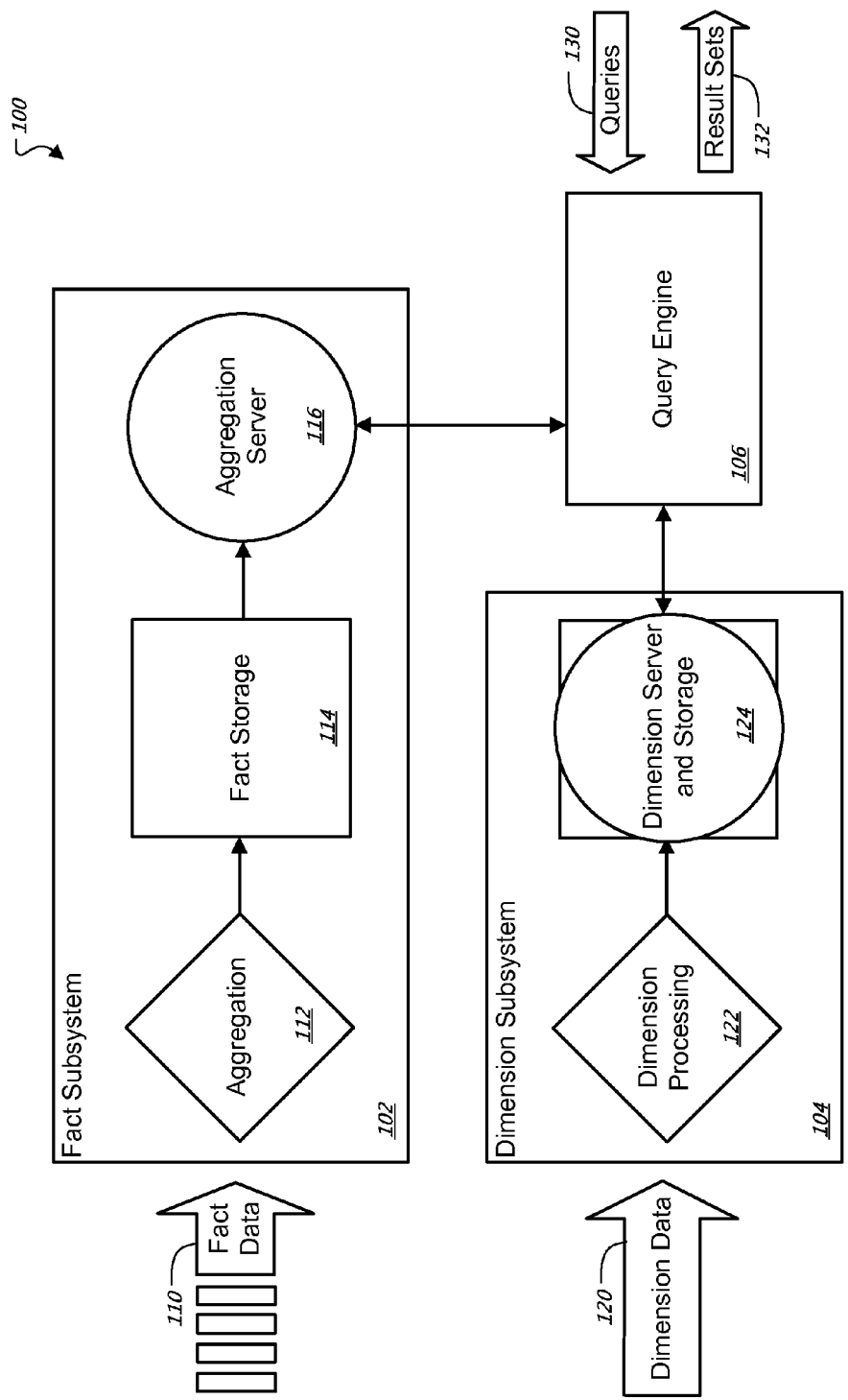
FIG. 1 is a block diagram of an implementation of a system for querying multidimensional data with independent fact and dimension data subsystems.

FIG. 1 is a block diagram of an implementation of a system 100 for querying multidimensional data with independent fact and dimension data subsystems. A fact subsystem 102 stores incremental records describing events (e.g. retail purchase orders, banking transactions) which are not typically modified at a later time, while a dimension subsystem 104 stores data describing entities (e.g., customer contact information, product descriptions) which can change slowly over time. Both the fact subsystem 102 and the dimension subsystem 104 use optimized storage methods to provide the easiest updating and access to each type of data. A query engine 106 queries both the fact subsystem 102 and the dimension subsystem 104 to fulfill query requests. The fact subsystem 102 and the dimension subsystem 104 can be implemented within one or more storage devices. In some implementations, the fact subsystem 102 and the dimension subsystem 104 are contained within separate computing devices such as networked servers. The query engine 106, in this example, can be contained within one of the networked devices hosting the fact subsystem 102 or the dimension subsystem 104, or the query engine 106 can be implemented within a third computing device such as a client computer. In some implementations, the fact subsystem 102, the dimension subsystem 104, and the query engine 106 are implemented within the same computing device. Copies of the fact subsystem 102 and/or the dimension subsystem 104, in some implementations, can be replicated across multiple storage devices and/or multiple computer devices. The query engine 106 can, similarly, be replicated within many computer devices. For example, many client devices in different locations, such as regional offices of a national corporation, can contain the query engine 106 for accessing the fact subsystem 102 and the dimension subsystem 104.

The fact subsystem 102 receives a stream of fact data 110. Typically, the fact data 110 is received in incremental updates, referred to as "deltas." In some implementations, the fact subsystem 102 receives billions of records each day within the fact data 110 deltas. In one example, the system 100 is a transactional database owned by a national bank. The fact data 110 can be received in deltas from regional offices, individual banks, and/or Automated Teller Machines (ATMs). Each record within the fact data 110 can, for example, relate to a transaction (e.g., deposit, withdrawal, transfer, etc.) made against a particular account.

Fact records, in general, consist of a single composite {key, value} pair. Keys typically contain information which can be used to uniquely identify an entity (e.g., the entities populating the dimension subsystem 104). Examples of keys relating to banking transactions can include, but are not limited to, customer identification, branch identification, account number, and transaction type. Value records contain information, frequently numerical, which can be aggregated. Examples of values relating to banking transactions can include, but are not limited to, withdrawal or deposit amount, amount transferred, etc. Once a fact record is received by the fact subsystem 102, the fact record is typically not updated at a later point in time.

Within the fact subsystem 102, the fact data 110 is passed to an aggregation engine 112. The aggregation engine 112 sums records received within a delta of fact data 110 into predetermined groupings related to common query requests. These predetermined groupings, in some implementations, can be read from the dimension data 120. For example, the aggregation engine 112 can sum the total dollar amount withdrawn per ATM zip code region per hour. The zip codes of every ATM machine in the network, in this example, can be provided by the dimension subsystem 104. Any number of aggregations can be processed by the aggregation engine 112 for a particular delta of fact data 110.

The aggregated data generated by the aggregation engine 112 is stored in a fact storage location 114 within the fact subsystem 102. The fact storage 114 can include any number of storage devices. In some implementations, the original fact data 110 is stored separately from the aggregated data. The records are stored in a manner that maximizes query performance.

For example, the aggregated data can be stored within an aggregate storage engine which is tuned to provide quick access to the aggregate data during query processing. When a query request is received by the fact subsystem 102, an aggregation server 116 sends a response. In one example, the aggregation server 116 can locate a previously calculated and stored aggregate which fulfills the query request. In another example, the aggregation server 116 can perform additional aggregation to fulfill the query request. For example, the aggregation engine 112 may have calculated the number of transactions per ATM per hour and stored the aggregate result within the fact storage 114. If the fact subsystem 102 receives a query regarding the number of transactions per ATM per day, the aggregation server 116 can sum the per hour aggregates during the 24-hour period associated with the day requested to generate the result. Other query fulfillment situations are possible. In some implementations, the aggregation server 116 is replicated to decrease processing time and/or to increase on-the-fly processing capacity.

The dimension subsystem 104 receives a snapshot of dimension data 120. Typically, the dimension data 120 is received in bulk at infrequent intervals. In some implementations, the dimension data 120 received completely replaces the dimension data 120 presently stored within the dimension subsystem 104. The dimension data 120 can, for example, be transferred from an external online transaction processing (OLTP) system. Dimension data 120 contains descriptive information which rarely undergoes modification (e.g., customer database, product description database, etc.). Each record within the dimension data 120 can, for example, relate to a customer (e.g., name, address, phone number) or account type (e.g., fee schedule, interest rate, minimum balance required). Each record of the dimension data 120 can be accessed by or sorted on one or more keys (e.g., customer identifier, account number, etc.).

Within the dimension subsystem 104, the dimension data 120 is passed to a dimension processing engine 122. The dimension processing engine 122 parses the dimension data 120 and formats it for storage within a dimension server and storage 124. In some implementations, the dimension processing engine 122 includes ACID-compliant updating of the dimension server and storage 124. For example, the dimension processing engine 122 can facilitate the replacement of some or all of the dimension data records such that no entries are duplicated or lost during the acceptance of the new dimension data 120 into the dimension subsystem 104. The dimension processing engine 122 can also, in some implementations, update indices associated with accelerating search results.

The dimension processing engine 122 stores the dimension data 120 within the dimension server and storage 124 in a manner which optimizes query response time against the dimension data 120. In some implementations, the dimension data 120 is stored in an RDBMS within the dimension server and storage 124. When a query is received by the dimension subsystem 104, the dimension server and storage 124 can locate identification keys associated with the query request and/or returns record details associated with identification keys which fulfill the query request.

The fact storage 114 and the dimension server and storage 124 can be implemented, for example, within a single RDBMS. In other implementations, the fact storage 114 can be implemented within a data warehousing schema, while the dimension server and storage 124 can be implemented within a relational database schema.

The query engine 106 receives a query 130, gathers query results from the fact subsystem 102 and/or the dimension subsystem 104, and returns a result set 132. The query 130 can, in some implementations, be received from a client device connected to the system 100 through a computer network (e.g. Wide Area Network, Local Area Network, etc.). The query 130 can be formatted in any manner of querying language including, but not limited to, Structured Query Language (SQL) or Object Query Language (OQL). The query engine 106 parses the query 130 and determines a query strategy for obtaining the information from the fact subsystem 102 and/or the dimension subsystem 104. The query engine 106 then combines the results obtained from the fact subsystem 102 and the dimension subsystem 104 to create the result set 132 which is returned in response to the submission of the query 130.

The system 100 can perform strategic database query searches, using the separate optimized fact and dimension subsystem architectures, in a three step approach. First, the query engine 106 uses filter information from the query 130 to retrieve a set of identifiers from the dimension subsystem 104. A query filter can be a comparison expression. For example, a query filter within a bank database could be ATM location equals zip code 90210. Using the query filter, the query engine 106 receives a set of ATM machine identifiers from the dimension server and storage 124.

In a second step, the query engine 106 can then request aggregated results from the aggregation server 116 based upon the grouping level requested within the query 130 and the identifiers obtained from the dimension server and storage 124. For example, the grouping level desired could be "group per hour". For each ATM located within the zip code region 90210, using the previous example, the aggregation server 116 could retrieve each aggregate number of dollars withdrawn per hour from each ATM location.

Using the resulting identifiers from step two, the query engine 106 requests detail values from the dimension server and storage 124. For instance, in relation to the list of ATM machine identifiers obtained from the aggregation server 116 in the second step of the query search, the query engine 106 can request human readable string values to provide descriptive query results, such as the street address of each ATM machine. Once the descriptive results have been obtained, they can be returned within the result set 132. In some implementations, iterative search strategies may be possible.

Not every query will require access to both the fact subsystem 102 and the dimension subsystem 104. For example, the query 130 could request the names and addresses of every customer who has purchased a home loan product so that a refinancing opportunity brochure can be mailed out. The dimension subsystem 104, in some implementations, can completely fulfill this request.

Fact Data Processing

Figure 2:
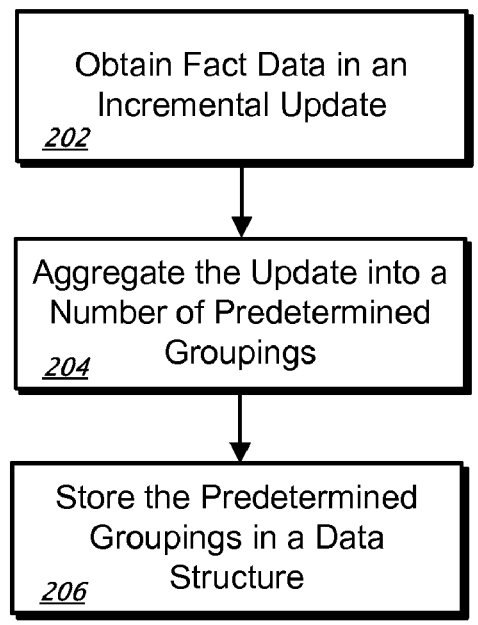
FIG. 2 is a flow diagram of an example process for acquiring, processing and storing fact data.

FIG. 2 is a flow diagram of an example process 200 for acquiring, processing and storing fact data. The process 200 begins at step 202 with obtaining fact data in an incremental update. Fact data contains records relating to a {key, value} pair. The incremental update can contain any number of data records. Fact data can be received from any number of locations. In one example, the data records pertain to shopping transactions. For example, a party supply retailer can have an online store in addition to multiple brick and mortar shops. Each location can send deltas of fact data containing shopping transaction information. In some implementations, incremental updates occur on a scheduled basis.

In step 204, the data records obtained within the incremental update are aggregated into a number of predetermined groupings. A grouping relates to a summation of data record values which can be used in response to common database queries. In some implementations, the database aggregations are optimized to handle pre-formatted queries which are submitted on a scheduled basis. For example, standard queries can be related to the generation of daily, weekly, and/or monthly reports of the transactional activities of the party supply retailer. Groupings can be created within a database so that common calculations are done once in advance rather than potentially many times during database querying. This can help to speed query response time. The sales per department, for example, can be aggregated for each incremental update received. If the incremental update is received from the party supply retailer's online store, for example, one grouping can be the online store's total sales of disposable dinnerware, in dollars, for the time period associated with the incremental update.

The aggregate data records, in step 206, are stored in a data structure. In some implementations, the data structure is organized using a data warehouse schema. Any number of storage devices can contain aggregate data records. The aggregate data records, in some implementations, can be replicated across multiple storage segments and/or devices. The aggregate data records can be stored in a manner (e.g., indexing, hierarchical tree structure, etc.) which allows quick access to information in response to a database query.

Dimension Data Processing

Figure 3:
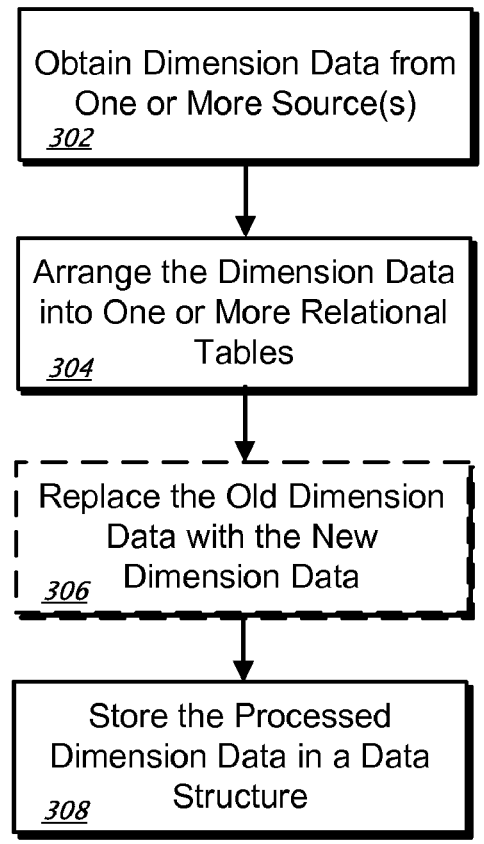
FIG. 3 is a flow diagram of an example process for acquiring, processing and storing dimension data

FIG. 3 is a flow diagram of an example process 300 for acquiring, processing and storing dimension data. The process 300 begins at step 302 with obtaining dimension data records. Dimension data contains entities which can change slowly over time. In some examples, dimension data can contain customer information, product information, and/or account information. The dimension data can be provided by one or more sources. For example, the customer information database can be provided by a different source than the product information database. In another example, multiple branch offices can each send dimension data relating to local customer information databases to the process 300.

At step 304, the dimension data is arranged into one or more relational tables. The dimension data records can be related to each other, for example, in an "is-a" or "has-a" relationship. For example, a checking account belonging to customer A "is a" no fee checking account. A customer "has a" checking account. Using the relationships between types of records, relational tables can be populated. Data keys create links between tables. For example, a customer record can contain a checking account key (e.g., identification number). The same checking account key can exist within an associated checking account record. That checking account record can contain a checking account type key. The checking account type key can relate to a basic checking account product provided by the bank. The relational tables, in some implementations, can be created within an RDBMS.

Optionally, the existing dimension data can be replaced with the newly received dimension data in step 306. The dimension data, in some implementations, is received from one or more external databases such as a customer database contained within an OLTP system. In this example, the entire contents of the existing dimension data can be overwritten by the up-to-date records received from the external database. To ensure the integrity of the dimensional data during replacement, in some implementations ACID-compliant methods can be used.

The processed dimension data, at step 308, is stored within a data structure. The data structure, in some implementations, is a relational database schema. The data structure is optimized to provide fast query access to the records within the dimension data. The dimension data can be stored within one or more storage devices on one or more computer devices. In some implementations, the dimension data can be replicated across multiple storage segments and/or devices.

Query Processing

Figure 4:
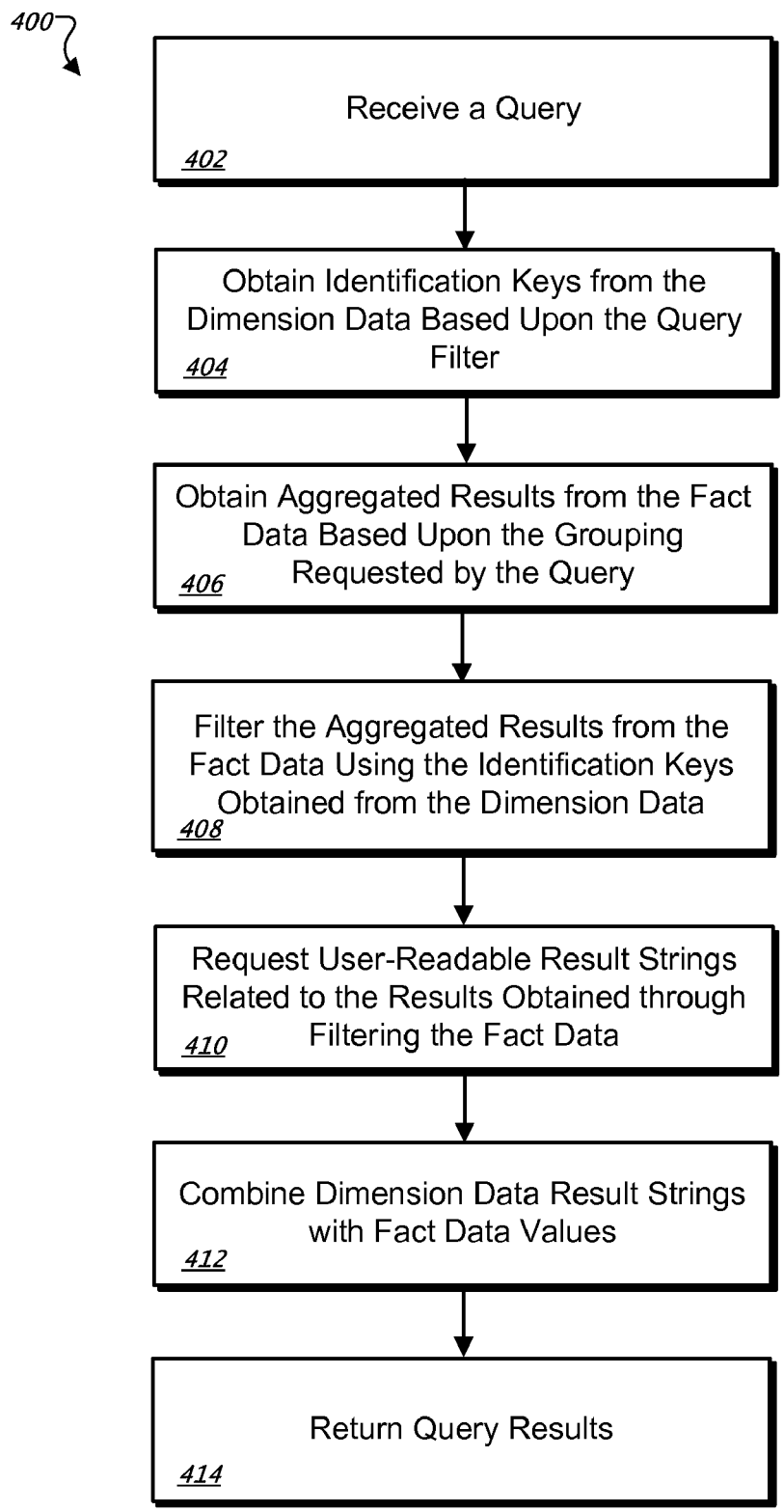
FIG. 4 is a flow diagram of an example process for combining output from the processes of FIGS. 2 and 3 at query time.

FIG. 4 is a flow diagram of an example process 400 for combining output from the processes of FIGS. 2 and 3 at query time. The process 400 begins at step 402 with receiving a query. The query can be formatted in any querying language. In some implementations, the query is a pre-formatted request submitted on a scheduled basis. For example, the query can be related to the generation of a daily, weekly, or monthly report of the transactional activities of a fashion retailer. In one example, the query is received by the query engine 106 (FIG. 1).

In step 404, the query is parsed to locate one or more query filters. Identification keys can be obtained from the dimension data (e.g., the dimension data manipulated by process 300 in FIG. 3) based upon the query filter. For example, using the query filter "product pricing method equals discount," a set of product identification keys related to products which are being offered at a discounted price can be obtained. In some implementations, the identification keys can be obtained from the dimension server and storage 124 (FIG. 1).

The query is parsed to select one or more grouping phrases in step 406. Aggregated results can be obtained from the fact data (e.g., the fact data manipulated by process 200 in FIG. 2) based upon the grouping requested within the query. For example, a grouping of total sales per product identifier for a timeframe of the past week could be requested. In some implementations, the groupings are requested from the aggregation server 116 (FIG. 1). In one example, the aggregation of total sales per product identifier by day has been previously calculated by the aggregation engine 112. However, the results of the individual days are summed by the aggregation server 116 at the time of the request to obtain values for total sales by week.

Using the identification keys obtained from the dimension data, at step 408, the aggregated results obtained from the fact data are filtered. Using the previous example, the identification keys contain all product keys in which the product is being offered at a discounted price. The aggregated results contain groupings of every product within the database based on total sales during the past week. The list of aggregated results can be narrowed to only those results which include the product identifier of a product which is being offered at a discounted price. In some implementations, the aggregation server 116 can filter the aggregate data. In other implementations, the query engine 106 filters the aggregate data.

At step 410, the resulting list of identification keys taken from the filtered aggregated results can be used to request user-readable result strings. For example, the aggregate records obtained within step 408 can include the fields {product identification key, time period, total sales}. Using the product identification keys, fields relating to each product such as product name, price, and product manufacturer, can be added to the information to make it more readable. In some implementations, the dimension server and storage 124 (FIG. 1) can provide the user-readable result strings related to the identification keys.

The user-readable result strings provided by the dimension data are combined with the aggregate values obtained from the fact data at step 412. In some implementations, the query engine 106 combines the results into a query result set. The query result set contains any number of records of information which fulfill the request provided within the query received. For example, the query could request the total sales revenue in the past week for each discounted product, returned within result records containing the following fields {product identification key, total sales, product name, sale price}. The query results are returned to the submitter of the query in step 414.

More or fewer steps can be included within process 400 depending upon the query issued. In some implementations, iterations of steps within process 400 can be executed to retrieve all of the information requested within the query. In some implementations, one or more steps within process 400 can be executed in a different order.

System Architecture

Figure 5:
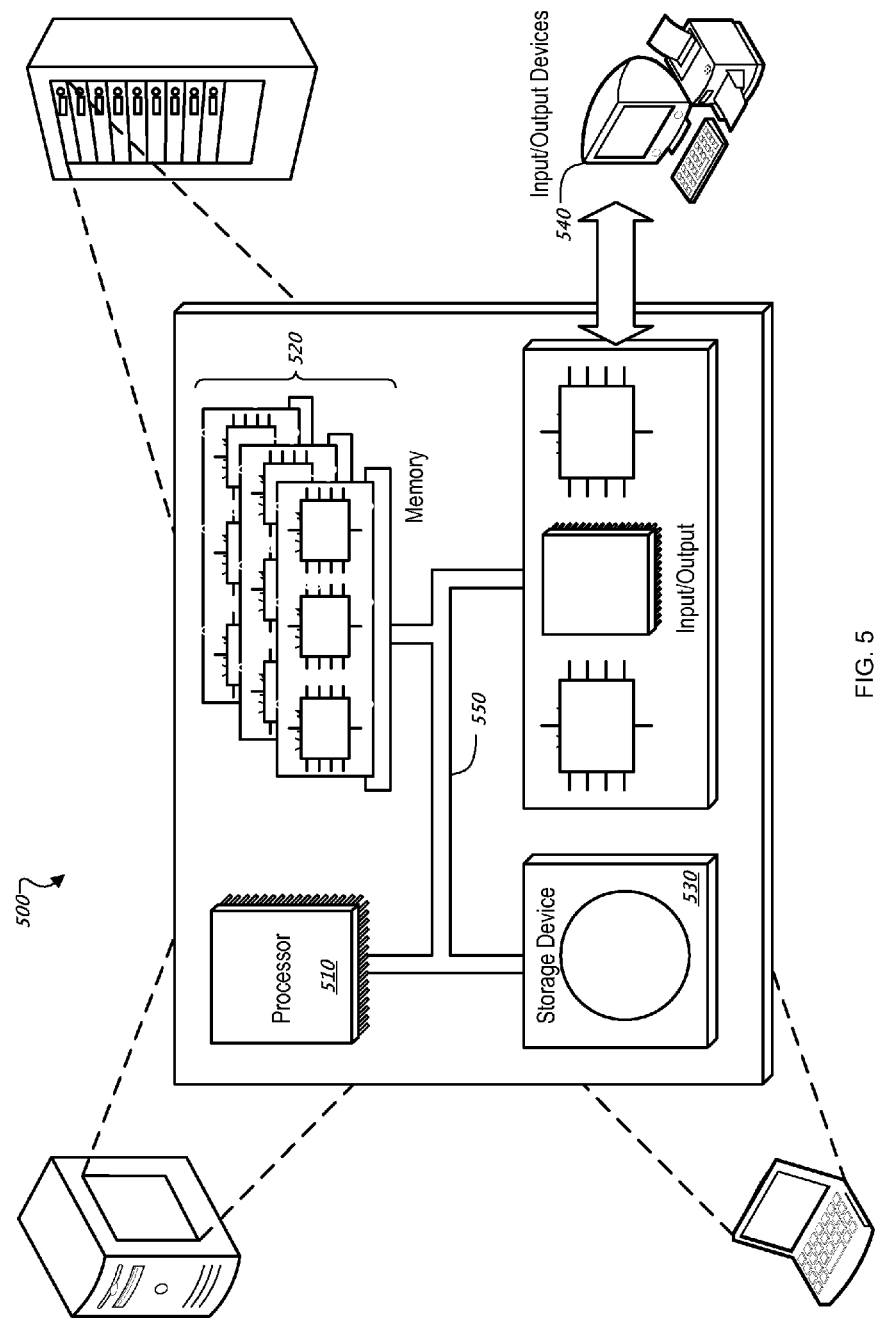
FIG. 5 is a block diagram of an example system architecture for performing the operations described in reference to FIGS. 1-4.

FIG. 5 is a block diagram of a system 500 for performing the various operations described in reference to FIGS. 1-4. For example, the system 500 may be included in the system 100, described in reference to FIG. 1. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In some implementations, the processor 510 is a single-threaded processor. In other implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In other implementations, the memory 520 is a volatile memory unit. In yet other implementations, the memory 520 is a non-volatile memory unit.

The storage device 530 is capable of providing mass storage for the system 500. In some implementations, the storage device 530 is a computer-readable medium. In various different implementations, the storage device 530 may be a floppy disk device, a hard disk device, an optical disk device, or a tape device.

The input/output device 540 provides input/output operations for the system 500. In some implementations, the input/output device 540 includes a keyboard and/or pointing device. In other implementations, the input/output device 540 includes a display unit for displaying graphical user interfaces.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, a wireless network, and the computers and networks forming the Internet.

The computer system can include clients and servers. A client and server are generally remote from each other and typically interact through a network, such as those described above with respect to FIG. 1. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   at a first computing device, receiving a query, the query including grouping information and filtering information;
   at the first computing device, producing, in response to the query, a result set from fact data, the fact data including keyed values and being stored at the first computing device, wherein the first computing device is optimized for the fact data, and wherein producing the result set includes:
   receiving, from a second computing device, a key for accessing a value of the fact data, the key being identified from dimension data and based at least in part on the filtering information, the dimension data being stored at the second computing device, wherein the second computing device is optimized for the dimension data;
   aggregating, from the fact data and based at least in part on the grouping information, a plurality of query results; and
   filtering the aggregated query results using the key received from the second computing device; and
   generating the result set based on the filtered query results.

2. The method of claim 1, where aggregating the query results comprises:
   obtaining the fact data as incremental updates;
   aggregating the updates into a number of predetermined groupings; and
   storing the predetermined groupings in a first data structure.

3. The method of claim 2, where each update includes one or more key/value pairs.

4. The method of claim 2, further comprising obtaining dimension data at the second computing device, where obtaining the dimension data comprises:
   obtaining the dimension data from one or more sources;
   processing the dimension data based on characteristics of the dimension data; and
   storing the processed dimension data in a second data structure.

5. The method of claim 1, further comprising:
   providing, at the first computing device, detail values relating to the filtered query results; and
   decorating the filter query results using the detail values such that the result set includes user readable result strings.

6. The method of claim 1, wherein:
   the first computing device is optimized by operations comprising:
   grouping one or more pre-formatted queries; and
   executing the grouped queries according to a schedule, where a common calculation in the grouped queries is performed before the grouped queries are executed; and
   the second computing device is optimized for query response time.

7. A system comprising:
   one or more computing devices configured to perform operations comprising:
   receiving a query, the query including grouping information and filtering information; and
   responsive to the query, producing, using a fact subsystem and a dimension subsystem, a result set, the result set being produced from fact data and dimension data, the fact data including one or more keyed values, the dimension data including definitions of one or more keys of the fact data, wherein:
   the dimension subsystem is optimized for the dimension data and is configured to perform first operations comprising:
   storing the dimension data; and
   identifying, from the dimension data and based at least in part on the filtering information, a key for accessing the fact data;
   the fact subsystem is optimized for the fact data and is configured to perform second operations comprising:
   storing the fact data;
   aggregating, from the fact data and based at least in part on the grouping information, a plurality of query results; and
   filtering the aggregated query results using the key identified by the dimension subsystem; and
   the result set includes the filtered query results.

8. The system of claim 7, wherein the fact subsystem is operable for:
   obtaining the fact data as incremental updates;
   aggregating the updates into a number of predetermined groupings; and
   storing the predetermined groupings in a first data structure.

9. The system of claim 8, where each update includes one or more key/value pairs.

10. The system of claim 8, wherein the dimension subsystem is operable for:
    obtaining dimension data from one or more sources;
    processing the dimension data based on characteristics of the dimension data; and
    storing the processed dimension data in a second data structure.

11. The system of claim 7, wherein:
    the dimension subsystem is contained in a first computing device; and
    the fact subsystem is contained in a second computing device, the second computing device being connected to the first computing device through a communications network.

12. The system of claim 7, wherein:
    the fact subsystem is optimized by operations comprising:
    grouping one or more pre-formatted queries; and executing the grouped queries according to a schedule, where a common calculation in the grouped queries is performed before the grouped queries are executed; and the dimension subsystem is optimized for query response time.

13. A non-transitory computer-readable storage medium having instructions stored thereon, the instructions operable to cause one or more computing devices to perform operations comprising:

receiving a query, the query including grouping information and filtering information; and responsive to the query, producing, using a fact subsystem and a dimension subsystem, a result set, the result set being produced from fact data and dimension data, the fact data including one or more keyed values, the dimension data including definitions of one or more keys of the fact data, wherein:

the dimension subsystem is optimized for the dimension data and is configured to perform first operations comprising:

storing the dimension data; and identifying, from the dimension data and based at least in part on the filtering information, a key for accessing the fact data;

the fact subsystem is optimized for the fact data and is configured to perform second operations comprising:

storing the fact data;

aggregating, from the fact data and based at least in part on the grouping information, a plurality of query results; and filtering the aggregated query results using the key identified by the dimension subsystem; and the result set includes the filtered query results.

14. The non-transitory computer-readable medium of claim 13, where the second operation further comprise:

obtaining the fact data as incremental updates;

aggregating the updates into a number of predetermined groupings; and storing the predetermined groupings in a first data structure.

15. The non-transitory computer-readable medium of claim 14, where each update includes one or more key/value pairs.

16. The non-transitory computer-readable medium of claim 14, where the first operations further comprise:

obtaining the dimension data from one or more sources;

processing the dimension data based on characteristics of the dimension data; and storing the processed dimension data in a second data structure.

17. The non-transitory computer-readable medium of claim 13, wherein:

the fact subsystem is optimized by operations comprising:

grouping one or more pre-formatted queries; and executing the grouped queries according to a schedule, where a common calculation in the grouped queries is performed before the grouped queries are executed; and the dimension subsystem is optimized for query response time.

* * * * *